US010662306B2

(12) United States Patent
Lim et al.

(10) Patent No.: US 10,662,306 B2
(45) Date of Patent: May 26, 2020

(54) OPTICAL FILM HAVING EXCELLENT WATER RESISTANCE AND SOLVENT RESISTANCE, AND POLARIZATION PLATE COMPRISING SAME

(71) Applicant: LG CHEM, LTD., Seoul (KR)

(72) Inventors: Yirang Lim, Daejeon (KR); Hwa Sub Shim, Daejeon (KR); Jun Wuk Park, Daejeon (KR); Sung Hyun Jeon, Daejeon (KR); Kyoung Won Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 256 days.

(21) Appl. No.: 15/312,534

(22) PCT Filed: Sep. 22, 2015

(86) PCT No.: PCT/KR2015/009967

§ 371 (c)(1),
(2) Date: Nov. 18, 2016

(87) PCT Pub. No.: WO2016/048016

PCT Pub. Date: Mar. 31, 2016

(65) Prior Publication Data

US 2017/0101517 A1 Apr. 13, 2017

(30) Foreign Application Priority Data

Sep. 22, 2014 (KR) ........................ 10-2014-0125835

(51) Int. Cl.

*C08J 7/04* (2020.01)
*G02B 5/30* (2006.01)
*C09D 167/00* (2006.01)
*C08F 220/32* (2006.01)
*C09D 133/00* (2006.01)
*C08F 222/10* (2006.01)
*G02B 1/14* (2015.01)
*C08J 7/12* (2006.01)
*B32B 27/30* (2006.01)
*B32B 27/36* (2006.01)

(52) U.S. Cl.

CPC ............. *C08J 7/0427* (2020.01); *C08J 7/123* (2013.01); *G02B 1/14* (2015.01); *G02B 5/3033* (2013.01); *B32B 27/30* (2013.01); *B32B 27/36* (2013.01); *C08F 220/325* (2020.02); *C08F 222/1061* (2020.02); *C08J 2333/12* (2013.01); *C08J 2335/02* (2013.01); *C08J 2400/10* (2013.01); *C08J 2400/104* (2013.01); *C08J 2400/105* (2013.01); *C08J 2433/04* (2013.01); *C08J 2451/08* (2013.01); *C08J 2467/02* (2013.01); *C08J 2475/04* (2013.01); *C09D 133/00* (2013.01); *C09D 167/00* (2013.01)

(58) Field of Classification Search

CPC ..... B32B 27/30; B32B 27/36; C08F 220/325; C08F 222/1061; C08J 2333/12; C08J 2335/02; C08J 2400/10; C08J 2400/104; C08J 2400/105; C08J 2433/04; C08J 2451/08; C08J 2467/02; C08J 2475/04; C08J 7/0427; C08J 7/123; C09D 133/00; C09D 167/00; G02B 1/14; G02B 5/3033

See application file for complete search history.

(56) References Cited

U.S. PATENT DOCUMENTS

2012/0263948 A1* 10/2012 Amano .................. C09J 133/08 428/355 AC
2015/0045491 A1 2/2015 Zhang et al.
2015/0362798 A1* 12/2015 Kwon ...................... G02B 5/30 428/1.5

FOREIGN PATENT DOCUMENTS

JP 1997169945 A 6/1997
JP 2015024511 A * 2/2015
KR 1020080096025 A 10/2008
KR 20130135768 A 12/2013
WO 2008110482 A1 9/2008
WO 2013139019 A1 9/2013
WO WO-2014123308 A1 * 8/2014 ............... G02B 5/30

OTHER PUBLICATIONS

Machine translation of KR 2013-0135768. (Year: 2013).*
Machine translation of JP 2015-024511. (Year: 2015).*

* cited by examiner

*Primary Examiner* — John D Freeman
(74) *Attorney, Agent, or Firm* — Dentons US LLP

(57) ABSTRACT

Disclosed are an optical film, including: a transparent film, and a coating layer on at least one surface of the transparent film, in which the coating layer is formed using a composition including a polymer resin, a dihydrazide-based cross-linking agent, and water-dispersible fine particles, and a polarizing plate including the same.

7 Claims, No Drawings

OPTICAL FILM HAVING EXCELLENT WATER RESISTANCE AND SOLVENT RESISTANCE, AND POLARIZATION PLATE COMPRISING SAME

CROSS-REFERENCE TO RELATED APPLICATIONS

This application is a National Stage Application of International Application No. PCT/KR2015/009967, filed Sep. 22, 2015, and claims the benefit of Korean Patent Application No. 10-2014-0125835, filed Sep. 22, 2014, the contents of which are incorporated herein by reference in their entirety for all purposes as if fully set forth below.

TECHNICAL FIELD

The present specification relates to an optical film having excellent water resistance and solvent resistance, and a polarizing plate including the same.

BACKGROUND ART

A polarizing plate has been typically used in a structure in which a protective film is laminated on one surface or both surfaces of a polarizer using an adhesive, in which the polarizer is formed of a polyvinyl alcohol (hereinafter, referred to as 'PVA')-based resin dyed with a dichroic dye or iodine. According to the related art, triacetyl cellulose (TAC)-based films have been usually used as protective films for a polarizing plate, but such TAC films have problems in that the films may be easily deformed under high temperature and high humidity environments. Accordingly, protective films formed of various materials, which are capable of being substituted for such TAC films, have been currently developed, and for example, methods of using polyethylene terephthalate (PET), cycloolefin polymer (COP), acrylic films, and the like alone or in combination have been proposed. Among them, acrylic films are advantageous in view of excellent optical properties and durability, and low costs, and thus are getting special attention.

However, since the surface of the films has non-polar characteristics, adhesive strength is not sufficiently secured when using a water-based adhesive which has been used for attaching a protective film to a polarizer in the related art. Further, since a polyvinyl alcohol-based resin, which is a main component, is an aqueous polymer in a polyvinyl alcohol-based adhesive usually used as the water-based adhesive, peeling often occurs at an interface between the polarizer and the protective film under humidity conditions. Methods of using a non-water based adhesive have been proposed in order to solve these problems, but an acrylic film has high surface frictional force and poor resistance to an organic solvent, and thus, it is difficult to coat an adhesive layer, and when an adhesive including an organic solvent is used, problems in that the surface of the film is damaged and the like occur.

In general, one surface of a polarizer protective film may include various functional coating layers such as a reflection prevention layer and a hard coating layer on an opposite surface to a surface onto which a polarizer is attached, for the purpose of preventing reflection, improving durability, preventing scratches, improving visibility, and the like, and these functional coating layers are generally formed by a method of applying a coating composition including a base resin, a solvent, an additive, and the like onto a protective film, and then curing the coating composition. However, the acrylic film has poor solvent resistance, so that there may occur a problem in that the functional coating layer is not coated well, or the surface of the film is melted and damaged when the functional coating layer is formed, and the like.

Since the acrylic film has higher surface frictional force than films formed of other materials, there are problems in that slip properties are poor during the winding of the film, so that the workability deteriorates, and there occurs a blocking phenomenon in which the film surfaces are adhered to each other after winding the film.

Therefore, there is a need for developing an optical film having excellent water resistance and solvent resistance while satisfying slip properties and not hindering transparency.

CITATION LIST

Patent Document

Official Gazette of Korean Patent Application Laid-Open No. 2010-0038413

SUMMARY OF THE INVENTION

The present specification has been made in an effort to provide an optical film having excellent water resistance and solvent resistance, and a polarizing plate including the same.

An exemplary embodiment of the present specification provides an optical film including: a transparent film; and a coating layer on at least one surface of the transparent film, in which the coating layer is formed using a composition including a polymer resin, a dihydrazide-based crosslinking agent, and water-dispersible fine particles.

The composition includes 100 parts by weight of a polymer resin; 0.01 parts by weight to 20 parts by weight of a dihydrazide-based crosslinking agent based on 100 parts by weight of the polymer resin; and 0.01 parts by weight to 30 parts by weight of water-dispersible fine particles based on 100 parts by weight of the polymer resin.

The dihydrazide-based crosslinking agent includes one or more selected from the group consisting of oxalic dihydrazide, malonic dihydrazide, succinic dihydrazide, adipic dihydrazide, sebacic dihydrazide, dodecanoic dihydrazide, isophthalic dihydrazide, piperazine N,N'-dihydrazide, m-benzene-dihydrazide, p-benzene-dihydrazide, and a compound represented by the following Formula 1.

[Formula 1]

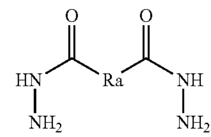

In Formula 1, Ra is a substituted or unsubstituted $C_1$ to $C_{20}$ alkylene group, a substituted or unsubstituted $C_6$ to $C_{20}$ arylene group, or a substituted or unsubstituted $C_5$ to $C_{20}$ cycloalkylene group.

The polymer resin is selected from the group consisting of a polyurethane-based resin, a polyester-based resin, an acrylic resin, and a mixture thereof.

The polyurethane-based resin includes one or more functional groups selected from the group consisting of a carboxyl group, a hydroxyl group, a sulfonate group, and a tertiary amine group, and the polyester-based resin includes a repeating unit represented by the following Formula 2.

[Formula 2]

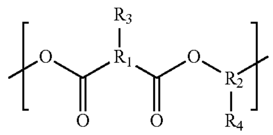

In Formula 2, $R_1$ and $R_2$ are the same as or different from each other and are each independently a substituted or unsubstituted $C_1$ to $C_{20}$ alkylene group, a substituted or unsubstituted $C_6$ to $C_{20}$ arylene group, or a substituted or unsubstituted $C_5$ to $C_{20}$ cycloalkylene group, and $R_3$ and $R_4$ are the same as or different from each other, at least one thereof is a carboxyl group, a hydroxyl group, or a sulfonate group, and $R_3$ and $R_4$ are each independently hydrogen, a carboxyl group, a hydroxyl group, a sulfonate group, a substituted or unsubstituted $C_1$ to $C_{20}$ alkyl group, a substituted or unsubstituted $C_6$ to $C_{20}$ aryl group, or a substituted or unsubstituted $C_5$ to $C_{20}$ cycloalkyl group.

Another exemplary embodiment of the present specification provides a polarizing plate including: a polarizer; and the optical film according to the present specification on at least one surface of the polarizer.

The optical film according to an exemplary embodiment of the present specification has excellent solvent resistance by including a coating layer, and thus has an advantage in that when a functional surface coating layer, such as a glare prevention coating, a reflection prevention coating, or a hard coating, is needed at the outside of the polarizing plate, the coating layer is very easily formed.

The optical film according to an exemplary embodiment of the present specification has excellent slip properties and may prevent a blocking phenomenon from occurring due to a low friction coefficient of the coating layer, and also has excellent appearance characteristics because transparency of the optical film may be secured due to a low haze.

The polarizing plate including the optical film according to an exemplary embodiment of the present specification has excellent water resistance.

DETAILED DESCRIPTION

Hereinafter, exemplary embodiments of the present specification will be described. However, the exemplary embodiments of the present specification may be modified into various other forms, and the scope of the present specification is not limited to the exemplary embodiments which will be described below. Further, the exemplary embodiments of the present specification are provided to more fully explain the present specification to a person with ordinary skill in the art.

As a result of intensive studies to develop an optical film in which a problem such as peeling between a polarizer and a protective film does not occur even under humidity conditions due to excellent water resistance, and a problem such as damage to the surface of the film or peeling of the coating layer does not occur, the present inventors have found a method for preparing an optical film according to an exemplary embodiment of the present specification. Specifically, according to an exemplary embodiment of the present specification, the optical film of the present specification includes: a transparent film; and a coating layer on at least one surface of the transparent film, in which the coating layer may be formed using a composition including a polymer resin, a dihydrazide-based crosslinking agent, and water-dispersible fine particles.

In the present specification, the term "substituted or unsubstituted" means that a group is substituted with one or two or more substituents selected from the group consisting of deuterium; a halogen group; a cyano group; a nitrile group; a nitro group; an imide group; an amino group; a silyl group; a boron group; a hydroxyl group; a carbonyl group; an alkyl group; a cycloalkyl group; an alkenyl group; an alkoxy group; an aryloxy group; an alkylthioxy group; an arylthioxy group; an aryl group; an aralkyl group; an aralkenyl group; an alkylaryl group; a heteroaryl group; an amine group; an alkylamine group; an aralkylamine group; a heteroarylamine group; an arylamine group; a phosphoryl group; an arylphosphine group; a phosphineoxide group; or a heteroaryl group including one or more of N, O, S, Se, and Si atoms or with a substituent to which two or more substituents are linked among the exemplified substituents, or a group has no substituent. For example, "the substituent to which two or more substituents are linked" may be a biphenyl group. That is, the biphenyl group may also be an aryl group, and may be interpreted as a substituent to which two phenyl groups are linked. The biphenyl group means a substituent to which two aryl groups are linked, but "the substituent to which two or more substituents are linked" may also be a substituent to which two or more different substituents are linked. For example, "the substituent to which two or more substituents are linked" may be a phenyl group substituted with a pyridyl group which is a substituent to which the pyridyl group and the phenyl group are linked, or a phenyl group substituted with a quinolinyl group which is a substituent to which the quinolinyl group and the phenyl group are linked, or a phenyl group substituted with a cyano group which is a substituent to which the cyano group and the phenyl group are linked.

In the present specification, the alkyl group may be straight-chained or branched, and the number of carbon atoms thereof is not particularly limited, but is preferably 1 to 50. Specific examples thereof include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohectylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylhexyl, 4-methylhexyl, 5-methylhexyl, and the like, but are not limited thereto.

In the present specification, the cycloalkyl group is not particularly limited, but the number of carbon atoms thereof is preferably 3 to 60, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, the alkenyl group may be straight-chained or branched, and the number of carbon atoms thereof is not particularly limited, but is preferably 2 to 40. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, the aryl group may be a monocyclic aryl group or a polycyclic aryl group, and includes the case where an alkyl group having 1 to 25 carbon atoms or an alkoxy group having 1 to 25 carbon atoms is substituted. Further, the aryl group in the present specification may mean an aromatic ring.

When the aryl group is a monocyclic aryl group, the number of carbon atoms thereof is not particularly limited, but is preferably 6 to 25. Specific examples of the monocyclic aryl group include a phenyl group, a biphenyl group, a terphenyl group, a stilbenyl group, and the like, but are not limited thereto.

When the aryl group is a polycyclic aryl group, the number of carbon atoms thereof is not particularly limited, but is preferably 10 to 24. Specific examples of the polycyclic aryl group include a naphthyl group, an anthracenyl group, a phenanthryl group, a pyrenyl group, a perylenyl group, a chrysenyl group, a fluorenyl group, and the like, but are not limited thereto.

In the present specification, the fluorenyl group may be substituted, and two substituents may combine with each other to form a spiro structure.

When the fluorenyl group is substituted, the fluorenyl group may be

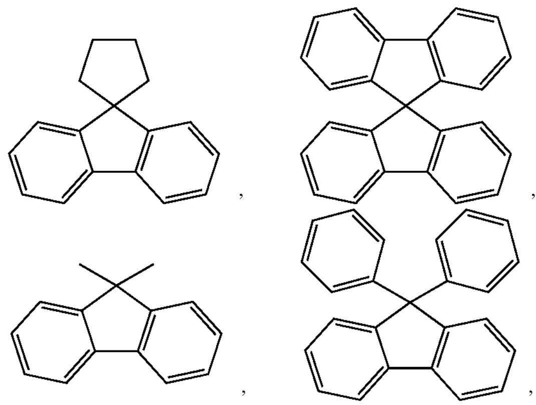

and the like. However, the group is not limited thereto.

In the present specification, the alkylene group means that there are two bonding positions in an alkyl group, that is, a divalent group. The above-described description on the alkyl group may be applied, except that these are each a divalent group.

In the present specification, the cycloalkylene group means that there are two bonding positions in a cycloalkyl group, that is, a divalent group. The above-described description on the cycloalkyl group may be applied, except that these are each a divalent group.

In the present specification, the above-described description on the aryl group may be applied to an arylene except for a divalent arylene group.

Hereinafter, the present specification will be described in more detail.

According to an exemplary embodiment of the present specification, the optical film of the present specification includes a transparent film and a coating layer on at least one surface of the transparent film, in which the coating layer may be formed using a composition including a polymer resin, a dihydrazide-based crosslinking agent, and water-dispersible fine particles.

According to an exemplary embodiment of the present specification, the composition which forms the coating layer includes 100 parts by weight of a polymer resin, 0.01 parts by weight to 20 parts by weight of a dihydrazide-based crosslinking agent based on 100 parts by weight of the polymer resin, and 0.01 parts by weight to 30 parts by weight of water-dispersible fine particles based on 100 parts by weight of the polymer resin.

Specifically, the content of the crosslinking agent is 0.01 parts by weight to 20 parts by weight, more specifically 0.01 parts by weight to 10 parts by weight, based on 100 parts by weight of the polymer resin. When the content of the crosslinking agent is less than 0.01 parts by weight based on 100 parts by weight of the polymer resin, there is no effect of improving solvent resistance, and when the content is more than 20 parts by weight, the coating properties is poor, so that there are problems in that the workability significantly deteriorates, and the storage stability deteriorates.

The content of the water-dispersible fine particles is 0.01 parts by weight to 30 parts by weight, preferably 0.01 parts by weight to 20 parts by weight, and more preferably 0.01 parts by weight to 10 parts by weight, based on 100 parts by weight of the polymer resin. When the content of the water-dispersible fine particles satisfies the numerical range, slip is performed well between the films and anti-blocking properties are improved during the winding, thereby leading to good winding property, and the defective rate is also improved after the winding. In addition, there is an advantage in that scratch resistance is improved, and transparency of the film is excellent due to a low haze value.

The composition of the present specification includes a dihydrazide-based crosslinking agent. The dihydrazide-based crosslinking agent is not particularly limited as long as the crosslinking agent is a crosslinking agent including two hydrazide groups in the molecule.

According to an exemplary embodiment of the present specification, the dihydrazide-based crosslinking agent may include one or more selected from the group consisting of oxalic dihydrazide, malonic dihydrazide, succinic dihydrazide, adipic dihydrazide, sebacic dihydrazide, dodecanoic dihydrazide, isophthalic dihydrazide, piperazine N,N'-dihydrazide, m-benzene-dihydrazide, p-benzene-dihydrazide, and a compound represented by the following Formula 1, but is not limited thereto.

[Formula 1]

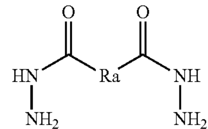

In Formula 1, Ra is a substituted or unsubstituted $C_1$ to $C_{20}$ alkylene group, a substituted or unsubstituted $C_6$ to $C_{20}$ arylene group, or a substituted or unsubstituted $C_5$ to $C_{20}$ cycloalkylene group.

According to an exemplary embodiment of the present specification, the polymer resin is selected from the group consisting of a polyurethane-based resin, a polyester-based resin, an acrylic resin, and a mixture thereof.

Specifically, the polymer resin is a water-dispersible polymer resin, and the type thereof is not limited. Specific examples of the water-dispersible polymer resin which may be used in the present specification include a polyurethane-based resin, a polyester-based resin, an acrylic resin, or a mixture thereof, and the like, but are not limited thereto.

The polyurethane-based resin means a resin including a urethane repeating unit, which is formed by a reaction between isocyanate and polyol, in the main chain, and in this case, the isocyanate is a compound two or more NCO groups, and the polyol is a compound including two or more hydroxyl groups, and examples thereof include a polyester-based polyol, a polycarbonate-based polyol, a polyether polyol, and the like, but are not limited thereto.

Specifically, examples of the isocyanate include toluene diisocyanate (TDI), 4,4-diphenyl methane diisocyanate (MDI), 1,5-naphthalene diisocyanate (NDI), tolidine diisocyanate (TODI), hexamethylene diisocyanate (HMDI), isopron diisocyanate (IPDI), p-phenylene diisocyanate, trans-cyclohexane, 1,4-diisocyanate and xylene diisocyanate (XDI), and the like, but are not limited thereto, but these components may include one or two or more thereof.

The polyester-based polyol may be obtained by reacting a polybasic acid component with a polyol component, and in this case, examples of the polybasic acid component include: an aromatic dicarboxylic acid such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, and tetrahydrophthalic acid; an aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; an alicyclic dicarboxylic acid such as hexahydrophthalic acid, tetrahydrophthalic acid, 1,3-cyclohexane dicarboxylic acid, and 1,4-cyclohexane dicarboxylic acid; or a reactive derivative thereof such as an acid anhydride, an alkyl ester, and an acid halide, but are not limited thereto, and these components may be used alone or in a combination of two or more thereof.

The polycarbonate-based polyol may be obtained by reacting a compound having a carbonate group with the polyol component, and in this case, examples of the compound having a carbonate group include diphenyl carbonate, dialkyl carbonate, alkylene carbonate, and the like, but are not limited thereto.

Meanwhile, the polyether polyol may be obtained by ring-opening polymerization of alkylene oxide on the polyol component.

The polyol component is not particularly limited as long as the polyol component has two or more hydroxyl groups in the molecule. For example, the polyol component is preferably at least one selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxy phenyl propane, 4,4'-dihydroxy methyl methane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. Among them, the polyol component is particularly preferably at least one selected from the group consisting of polytetramethylene glycol (PTMG), polypropylene glycol (PPG), and polyethylene glycol (PEG).

Meanwhile, the polyurethane-based resin may further include other polyols or chain extenders in addition to the components within a range in which properties of the present specification are not impaired.

Examples of the others polyol include polyols having three or more hydroxyl groups, such as sorbitol, glycerin, trimethylolethane, trimethylolpropane, and pentaerythritol, but are not limited thereto.

Examples of the other chain extenders include glycols such as ethylene glycol, diethylene glycol, triethylene glycol, 1,3-propanediol, 1,3-butanediol, 1,4-butanediol, neopentyl glycol, pentanediol, 1,6-hexanediol, and propyleneglycol, but are not limited thereto.

Meanwhile, the polyurethane-based resin may further include a neutralizing agent, if necessary. When the neutralizing agent is included, stability of the urethane resin in water is improved. Examples of the neutralizing agent may include one or two or more selected from the group consisting of ammonia N-methylmorpholine, triethylamine, dimethylethanolamine, methyldiethanolamine, triethanolalkyne, morpholine, tripropylamine, ethanolamine, and triisopropanolamine.

It is preferred that the preparation of the polyurethane-based resin is performed in an organic solvent which is inert to the isocyanate and compatible with water. Examples of the organic solvent may include one or two or more selected from the group consisting of an ester-based solvent such as ethyl acetate and ethyl cellosolve acetate, a ketone-based solvent such as acetone, methyl ethyl ketone, and methylisobutylketone, and an ether-based solvent such as dioxane tetrahydrofuran.

The polyurethane-based resin of the present specification may be prepared through a one-shot method and a multistage method, and the like, which are well-known in the art. Specifically, the one-shot method is a method of reacting each component at a time, and the multistage method is a method of reacting each component step by step. In addition, a urethane reaction catalyst may be further included when the polyurethane-based resin is prepared.

Meanwhile, the polyurethane resin is not limited to, but is particularly preferably a carbonate-based polyurethane resin which uses a polycarbonate-based polyol as a reactant, or an ester-based polyurethane resin which uses a polyester-based polyol as a reactant, from the viewpoint of dispersibility and transparency.

It is preferred that the polyurethane-based resin has a weight average molecular weight of 10,000 to 1,000,000. When the weight average molecular weight of the polyurethane-based resin satisfies the numerical range, there are effects in that sufficient adhesive strength may be implemented, and water dispersibility is excellent.

According to an exemplary embodiment of the present specification, it is preferred that the polyurethane-based resin includes one or more functional groups selected from the group consisting of a carboxyl group, a hydroxyl group, a sulfonate group, and a tertiary amine group. This is because when the functional groups are included in the polyurethane-based resin, adhesive strength and water dispersibility for the adhesive layer are significantly improved. Meanwhile, the polyurethane-based resin including the functional group as described above may be prepared by a method of using a compound including the functional groups as the polyol and/or isocyanate, or adding a chain extender including the functional groups during the reaction of polyol and isocyante. For example, the polyurethane-based resin including a carboxyl group or a tertiary amine group may be prepared by adding a chain extender having a free carboxyl group or a free amine group to perform reaction during the reaction of polyester polyol and isocyanate. In this case, examples of the chain extender having a free carboxyl group include dihydroxy carboxylic acid, dihydroxy succinic acid, and the like, but are not limited thereto. Examples of the dihydroxy carboxylic acid may include one or two or more selected from the group consisting of dialkylol alkanoic acids including a dimethylol alkanoic acid such as dimethylol acetic acid, dimethylol butanoic acid, dimethylol propionic acid, dimethylol butyric acid, and dimethylol pentanoic acid. Meanwhile, examples of the chain extender including a free amine group include: aliphatic diamines such as ethylenediamine, propylenediamine, hexamethylenediamine, 1,4-butanediamine, and aminoethylethanolamine; alicyclic diamines such as isophoronediamine and 4,4'-dicyclohexylmethanediamine; aromatic diamines such as xylenediamine and tolylenediamine, and the like, but are not limited thereto, and the chain extender may be a chain extender including one or two or more selected from the group consisting of these amines.

In the present specification, the polyester-based resin means a resin including an ester group, which is formed by reacting carboxylic acid and alcohol, in the main chain, and may be preferably a water-dispersible resin, and more preferably, includes polyester glycol formed by reacting polybasic acid and polyol.

In this case, examples of the polybasic acid component include: an aromatic dicarboxylic acid such as orthophthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, and tetrahydrophthalic acid; an aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; an alicyclic dicarboxylic acid such as hexahydrophthalic acid, tetrahydrophthalic acid, 1,3-cyclohexane dicarboxylic acid, and 1,4-cyclohexane dicarboxylic acid; or a reactive derivative thereof such as an acid anhydride, an alkyl ester, and an acid halide, but are not limited thereto, and the component may include one or two or more selected from the group consisting of these components. Among them, terephthalic acid, isophthalic acid, succinic acid, and the like are particularly preferred. Further, when isophthalic acid substituted with sulfonate is used as a basic acid, the isophthalic acid is particularly preferred in terms of water dispersibility.

The polyol is not particularly limited as long as the polyol includes two or more hydroxyl groups in the molecule, and preferred examples of the polyol include one or more selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxy phenyl propane, 4,4'-dihydroxy methyl methane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. Further, when one or two or more selected from the group consisting of a dimethylol alkanoic acid containing a carboxyl group, dimethylol acetic acid, dimethylol propionic acid, and dimethylol butanoic acid are included as the polyol, the polyol is particularly preferred in terms of water dispersibility.

It is preferred that the polyester glycol is formed by reacting polybasic acid and polyol at a molar ratio of 2.5:1 to 1:2.5, preferably 2.3:1 to 1:2.3, and more preferably 2:1 to 1:2. This is because when the reaction molar ratio of polybasic acid and polyol exceeds the numerical range, odor is generated by unreacted monomers, or defective coating may be caused.

The method of preparing the polyester resin may be performed by a method which is well-known in the art, for example, a method of performing an esterification reaction of polybasic acid and polyol, and then performing a polycondensation, or a method of performing an esterification reaction of polybasic acid anhydride and polyol, and then performing a polycondensation, and the like.

Specifically, the methods may include (1) a raw material mixing step of obtaining a raw material mixture by mixing polymerization raw materials for polymerization of polyester, (2) an esterification reaction step of esterifying the raw material mixture, and (3) a polycondensation step of obtaining polyester by polycondensating the esterified raw material mixture. Meanwhile, the polyester-based resin of the present specification, which is prepared through the aforementioned method, includes a repeating unit represented by the following Formula 2.

[Formula 2]

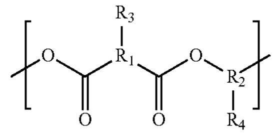

In Formula 2, $R_1$ and $R_2$ are the same as or different from each other and are each independently a substituted or unsubstituted $C_1$ to $C_{20}$ alkylene group, a substituted or unsubstituted $C_6$ to $C_{20}$ arylene group, or a substituted or unsubstituted $C_5$ to $C_{20}$ cycloalkylene group, and $R_3$ and $R_4$ are the same as or different from each other, at least one thereof is a carboxyl group, a hydroxyl group, or a sulfonate group, and $R_3$ and $R_4$ are each independently hydrogen, a carboxyl group, a hydroxyl group, a sulfonate group, a substituted or unsubstituted $C_{1\ to\ 20}$ alkyl group, a substituted or unsubstituted $C_6$ to $C_{20}$ aryl group, or a substituted or unsubstituted $C_5$ to $C_{20}$ cycloalkyl group. In this case, it is particularly preferred that $R_3$ or $R_4$ is a carboxyl group or a sulfonate group.

More specifically, the polyester resin used in the present specification may include a repeating unit represented by the following Formula 3.

[Formula 3]

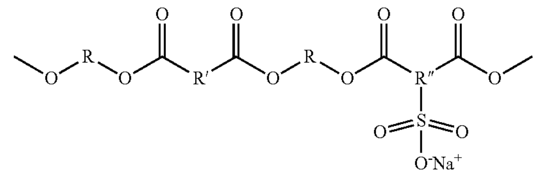

In Formula 3, R, R', and R" are each independently a substituted or unsubstituted $C_1$ to $C_{20}$ alkylene group, a substituted or unsubstituted $C_6$ to $C_{20}$ arylene group, or a substituted or unsubstituted $C_5$ to $C_{20}$ cycloalkylene group.

The polyester resin may further include additional components in addition to the aforementioned components within a range in which properties of the present specification are not impaired.

Meanwhile, the acrylic resin means a resin including a repeating unit derived from the (meth)acrylate units, and the acrylic resin of the present specification may be, for example, prepared by copolymerizing an acrylic monomer including a sulfonic acid or a vinyl monomer, or copolymerizing other monomers by adding the acrylic monomer to a vinyl monomer component, but is not limited to the acrylic resin prepared by the method, and may include one or two or more selected from the group consisting of the acrylic resins. In this case, examples of the other monomers include: unsaturated nitriles such as (meth)acrylonitrile; unsaturated amides such as (meth)acrylamide; β-unsaturated aliphatic monomers such as halogenated vinyl chloride and vinylidene chloride; β-unsaturated aromatic monomers such as styrene and methyl styrene, and the like, but are not limited thereto, and may include one or two or more selected from the group consisting of these components.

The acrylic resin may include a repeating unit represented by the following Formula 4.

[Formula 4]

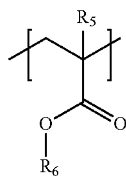

In Formula 4, $R_5$ is hydrogen or a substituted or unsubstituted $C_1$ to $C_{20}$ alkyl group, preferably hydrogen or a methyl group, and $R_6$ is hydrogen, an epoxy group, a hydroxyl group, or a substituted or unsubstituted $C_1$ to $C_{20}$ alkyl group.

According to an exemplary embodiment of the present specification, the polymer resin may include two or more of an ester-based repeating unit, a urethane-based repeating unit, and an acrylic repeating unit. Specifically, the polymer resin may be a polyester acrylic resin, a polyester urethane-based resin or a polyurethane acrylic resin, and may also include all the three repeating units.

In this case, the polyester acrylic resin is a resin including an ester-based repeating unit and acrylic repeating unit, and is prepared by copolymerizing an acrylic monomer component with polyester glycol. More specifically, the water-dispersible polyester acrylic resin of the present specification may include the ester-based repeating unit represented by Formula 2 and an acrylic repeating unit represented by Formula 4.

In this case, the polyester glycol is the same as that described in the polyester resin. Meanwhile, examples of the acrylic monomer may include one or more selected from the group consisting of alkyl (meth)acrylates, alkyl acrylates, epoxy (meth)acrylates, hydroxyalkyl acrylates, alkyl (meth) acrylic acids including a carbonyl group, alkyl acrylic acids, and acrylates including sulfonate. In this case, examples of the acrylates including sulfonate include acrylates including sodium 2-methyl-2-propene-1-sulfonate, acrylates including sodium aryl sulfonate, and acrylates including 2-propene-1-sulfonate, but are not limited thereto. Meanwhile, when the polyester resin is copolymerized with epoxy group-containing epoxy acrylate monomers among the acrylic monomers, there is an advantage in that the high temperature stability of the polyester resin is increased because epoxy rings of the epoxy group-containing epoxy acrylate monomers are dissociated at high temperatures and are cross-linked by additional polymerization reaction between the epoxy rings to improve high temperature durability of main chains of the polyester resin.

The polyester acrylic resin is prepared by copolymerizing other monomers in addition to acrylic monomer components, if necessary. In this case, examples of the other monomers include one or two or more selected from the group consisting of unsaturated nitriles such as (meth) acrylonitrile; unsaturated amides such as (meth)acrylamide; olefins such as ethylene and propylene; β-unsaturated aliphatic monomers such as halogenated vinyl chloride and vinylidene chloride; and β-unsaturated aromatic monomers such as styrene and methyl styrene.

More preferably, the polyester acrylic resin of the present specification includes two or more acrylic monomers, most preferably alkyl (meth)acrylate monomers and epoxy (meth) acrylate monomers such as glycidyl (meth)acrylate.

For the polyester acrylic resin, the weight ratio of polyester glycol to acrylic monomer in the reactant is 1:9 to 9:1, more preferably 2:8 to 8:2, and most preferably 3:7 to 7:3, but is not limited thereto. When the content of polyester glycol and acrylic monomer in the reactant satisfies the numerical range, properties of the polyester acrylic resin, such as adhesion to a base material and solvent resistance, are excellent.

Meanwhile, the polyester urethane-based resin includes both an ester-based repeating unit and a urethane-based repeating unit, and may be, for example, prepared by reacting isocyanate with the above-described polyester resin. In this case, the equivalent ratio of the polyester resin to isocyanate is, for example, 2:1 to 1:2, preferably 1.5:1 to 1:1.5, and more preferably 1.2:1 to 1:1.2. When the equivalent ratio satisfies the numerical range, appearance characteristics of the coating layer formed using a coating composition including the equivalent ratio is excellent, and properties of the polyester urethane-based resin such as adhesion to a base material and solvent resistance are more improved.

The polyurethane acrylic resin is a resin including a urethane unit and an acrylic unit, and may be prepared by additionally copolymerizing an acrylic monomer component with a polyurethane resin. In the case of the polyurethane acrylic resin as described above, solvent resistance and transparency are more improved as compared to a polyurethane-based resin which does not include an acrylic unit.

Examples of the acrylic monomer may include one or more selected from the group consisting of alkyl (meth) acrylates, alkyl acrylates, epoxy (meth)acrylates, hydroxyalkyl acrylates, alkyl (meth)acrylic acids including a carbonyl acid, alkyl acrylic acids, and acrylates including sulfonate. In this case, examples of the acrylates including sulfonate may include acrylates including sodium 2-methyl-2-propene-1-sulfonate, acrylates including sodium aryl sulfonate, and acrylates including 2-propene-1-sulfonate, but are not limited thereto.

The polyurethane acrylic resin may be prepared by copolymerizing other monomers in addition to acrylic monomer components, if necessary. In this case, examples of the other monomers include: unsaturated nitriles such as (meth)acrylonitrile; unsaturated amides such as (meth)acrylamide; olefins such as ethylene and propylene; β-unsaturated aliphatic monomers such as halogenated vinyl chloride and vinylidene chloride; β-unsaturated aromatic monomers such as styrene and methyl styrene, and the like, and may include one or two or more selected from the group consisting of these monomers.

For the polyurethane acrylic resin, the weight ratio of the polyurethane resin to the acrylic monomer is 1:9 to 9:1, more preferably 2:8 to 8:2, but is not limited thereto. When the weight ratio of the polyurethane resin to the acrylic monomer satisfies the numerical range, the polymer resin is easily synthesized, and the coating properties of the composition including the polymer resin is excellent.

Meanwhile, the polymer resin of the present specification may further include additional components in addition to the aforementioned components within a range in which properties of the present specification are not impaired.

According to an exemplary embodiment of the present specification, the water-dispersible fine particles may include one or more selected from the group consisting of silica, titania, alumina, zirconia, and antimony-based fine particles.

The water-dispersible fine particles may be prepared by, for example, inorganic fine particles, organic fine particles, or a combination thereof. Examples of the inorganic fine particles include inorganic oxides such as silica, titania, alumina, zirconia, antimony, and zinc-based oxide, but are not limited thereto. Further, examples of the organic fine particles include silicone-based resins, fluorine-based resins, (meth)acrylic resins, cross-linked polyvinyl alcohols, melamine-based resins, and the like, but are not limited thereto.

In the composition according to the present specification, the water-dispersible fine particles are preferably silica. This is because silica is excellent in blocking suppression capability, rarely generates haze due to excellent transparency, and does not have any coloring, so that optical properties of a polarizing plate are less influenced by silica. Further, workability during the formation of a coating layer is also more excellent since colloidal silica is good at dispersibility and dispersion stability with respect to a composition.

Meanwhile, the water-dispersible fine particles preferably have an average diameter (an average diameter of primary particles) of about 50 nm to about 500 nm or about 100 nm to about 300 nm. When the average particle diameter of the water-dispersible fine particles is less than 50 nm, stability of the solution may be hindered since agglomeration and precipitation of the water-dispersible fine particles occur in the coating composition due to an increase in surface energy, and when the average particle diameter thereof is more than 500 nm, haze of the particles is increased by scattering light having a wavelength of 400 nm or more since the water-dispersible particles is not evenly dispersed in the coating composition, and sizes of the water-dispersible particles are increased compared to a wavelength of visible light (400 nm to 800 nm) while the particles are agglomerated. Accordingly, particles having an average particle diameter within the above-described range are used to appropriately form unevenness on the surface of the coating layer, so that frictional forces particularly on contact surfaces between the acrylic film and the coating layer and between the coating layers are effectively reduced. As a result, it is possible to further improve blocking suppression capability.

Since the composition of the present specification is a water-based composition, the fine particles are preferably mixed as a water dispersion. Specifically, when silica is adopted as the fine particles, the fine particles are mixed as colloidal silica. Products commercially available in the corresponding technical field as colloidal silica may be used as they are, and it is possible to use, for example, Snowtex Series manufactured by Nissan Chemical Corporation, AEROSIL Series manufactured by Air Products & Chemicals, Epostar Series and Soliostar RA Series manufactured by Nippon Shokubai Co., Ltd., LSH Series by Ranco, and the like.

A coating layer formed of the composition as described above has excellent solvent resistance, and thus, may improve adhesion to various functional coating layers such as a reflection prevention layer and a hard coating layer, and simultaneously, improve adhesion to the water-based adhesive and the non-water based adhesive. Furthermore, the optical film including the coating layer according to the present specification also has excellent slip properties, and thus, has an advantage in that the workability is also excellent.

The fine particles are not essentially included in the surface coating layer, and may or may not be included in the surface coating layer, if necessary. As the fine particles, organic fine particles, inorganic fine particles, or a mixture thereof may be used, and the content of the fine particles is 0.1 to 100 parts by weight based on 100 parts by weight of a binder resin, but is not limited thereto. When the content of the fine particles satisfies the numerical range, there are advantages in that sufficient unevenness is formed on the coating film, and the coating properties becomes good.

The inorganic fine particles may include one or two or more selected from the group consisting of silica, silicon particles, aluminum hydroxide, magnesium hydroxide, alumina, zirconia, and titania, but are not limited thereto.

The organic fine particles may include one or a copolymer of two or more selected from the group consisting of polystyrene, polymethyl methacrylate, polymethyl acrylate, polyacrylate, polyacrylate-co-styrene, polymethylacrylate-co-styrene, polymethylmethacrylate-co-styrene, polycarbonate, polyvinyl chloride, polybutylene terephthalate, polyethylene terephthalate, polyamides, polyimides, polysulfone, polyphenylene oxide, polyacetal, epoxy resins, phenolic resins, silicone resins, melamine resins, benzoguamine, polydivinylbenzene, polydivinylbenzene-co-styrene, polydivinylbenzene-co-acrylate, polydiallyl phthalate and triallyl isocyanurate polymer.

According to an exemplary embodiment of the present specification, the coating layer has a thickness of 50 nm to 2,000 nm.

Specifically, the coating layer has a thickness of 50 nm to 2,000 nm, 100 nm to 1,000 nm, or 200 nm to 800 nm. When the thickness of the coating layer satisfies the numerical range, adhesiveness, adhesion, and winding property are excellent.

The friction coefficient of the coating layer is, for example, 0 to 0.6, but is not limited thereto. The lower the friction coefficient of the coating layer is, the better the slip properties are, and when the friction coefficient satisfies the numerical range, the winding property is excellent. In this case, the friction coefficient means a relative ratio calculated by dividing the frictional force by the normal force.

In the present specification, transparency (haze) of the coating layer may 0 to 5 or 0.1 to 3. The lower the transparency of the coating layer is, the better the coating layer is, and when the transparency satisfies the numerical range, the transparency of the film is excellent.

The transparent film is formed in a single layer or in a structure that two or more films are laminated, and when the transparent film is formed in a structure that two or more films are laminated, the laminated films are formed of materials that are the same as or different from each other.

The transparent film is preferably an acrylic film. In this case, the acrylic film means a film including, as a main component, a resin including an acrylate-based unit and/or a (meth)acrylate-based unit, and is a concept including films including, as main components, copolymer resins, in which other monomer units other than the acrylate-based units and/or the (meth)acrylate-based units are copolymerized, as well as homopolymer resins consisting of the acrylate-based unit or the (meth)acrylate-based unit, and films formed by a blend resin in which other resins are blended into the above-described acrylic resin.

In this case, examples of the acrylic film include films including: a copolymer including an alkyl (meth)acrylate-based unit and a styrene-based unit; and an aromatic resin including a carbonate part in the main chain, films including an alkyl (meth)acrylate-based unit and a 3- to 6-membered heterocyclic unit substituted with at least one carbonyl group, or films including an alkyl (meth)acrylate-based unit, a styrene-based unit, 3- to 6-membered heterocyclic unit substituted with at least one carbonyl group, and a vinyl cyanide unit, or acrylic films having a lactone structure, but are not limited thereto.

Examples of the monomer unit, which may be copolymerized into the acrylic resin, include an aromatic vinyl-based unit, a 3- to 6-membered heterocyclic unit substituted with a carbonyl group, an acrylic acid unit, a glycidyl unit, and the like. In this case, the aromatic vinyl-based unit refers to, for example, a unit derived from styrene, α-methyl styrene, and the like, and the 3- to 6-membered heterocyclic unit substituted with a carbonyl group refers to, for example, a unit derived from lactone rings, glutaric anhydrides, glutarimides, maleimides, maleic anhydrides, and the like.

For example, the acrylic film is a film including a copolymer including an alkyl (meth)acrylate-based unit and a 3- to 10-membered heterocyclic unit substituted with at least one carbonyl group, and examples of the 3- to 10-membered heterocyclic unit substituted with the carbonyl group include lactone rings, glutaric anhydrides, glutarimides, maleic anhydrides, maleimides, and the like.

Still another example of the acrylic film includes a film including a blending resin in which an aromatic resin having a carbonate part in the main chain of the acrylic resin is blended. In this case, examples of the aromatic resin having a carbonate part in the main chain include a polycarbonate resin, a phenoxy resin, and the like.

The method of preparing the acrylic resin film is not particularly limited, and for example, the acrylic resin film is prepared by sufficiently mixing an acrylic resin, other polymers, additives, and the like by any appropriate mixing method to prepare a thermoplastic resin composition, and then film-molding the thermoplastic resin composition, or preparing the acrylic resin, other polymers, additives and the like as a separate solution, mixing the mixture to form a uniform mixture solution, and then film-molding the mixture.

The thermoplastic resin composition is, for example, prepared by pre-blending the film raw material by any appropriate mixer such as an omni-mixer, and then extrusion-kneading the obtained mixture. In this case, the mixture used in extrusion-kneading is not particularly limited, and for example, an extruder such as a single-screw extruder and a twin-screw extruder or any appropriate mixer such as a pressure kneader is used.

Examples of the film-molding method include a solution cast method (a solution casting method), a melt extrusion method, a calendaring method, a compression molding method, and the like. Among the film forming methods, a solution cast method (a solution casting method) and a melt extrusion method are preferred.

Examples of solvents used in the solution cast method (a solution casting method) include: aromatic hydrocarbons such as benzene, toluene, and xylene; aliphatic hydrocarbons such as cyclohexane and decaline; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethyl formamide; dimethyl sulfoxide, and the like, but are not limited thereto, and may include one or two or more selected from the group consisting of these components.

Examples of an apparatus for performing the solution cast method (a solution casting method) include a drum-type casting machine, a band-type casting machine, a spin coater and the like. Examples of the melt extrusion method include a T-die method, an inflation method, and the like. The forming temperature is preferably 150° C. to 350° C., and more preferably 200° C. to 300° C.

When a film is formed by the T-die method, a T-die is mounted on a front end portion of a publicly-known single- or twin-screw extruder, a film extruded in a film form is wound to prepare a roll-shaped film. In this case, by appropriately adjusting a temperature of a winding roll, it is possible to stretch the film in an extrusion direction to perform monoaxial stretching, and it is also possible to stretch the film in a direction perpendicular to the extrusion direction to perform simultaneous biaxial stretching, successive biaxial stretching and the like.

The acrylic film may be a non-stretched film or a stretched film. The acrylic film is a monoaxially stretched film or a biaxially stretched film when the acrylic film is a stretched film, and the acrylic film is a simultaneously biaxially stretched film or a successively biaxially stretched film when the acrylic film is the biaxially stretched film. When the acrylic film is biaxially stretched, mechanical strength of the film is improved, so that performance of the film is improved. The acrylic film may suppress an increase in phase difference and maintain optical isotropy even when the acrylic film is mixed with other thermoplastic resins to stretch the film.

A stretching temperature is preferably within a range near a glass transition temperature of a thermoplastic resin composition as the film raw material, preferably (a glass transition temperature−30° C.) to (a glass transition temperature+100° C.), and more preferably (a glass transition temperature−20° C.) to (a glass transition temperature+80° C.). A sufficient stretching magnification is not obtained when the stretching temperature is less than (a glass transition temperature−30° C.), and on the contrary, when the stretching temperature exceeds (a glass transition temperature+100° C.), flowing (flow) of the resin composition occurs so that stable stretching is not conducted.

A stretching magnification ratio defined as an area ratio is preferably 1.1 times to 25 times and more preferably 1.3 times to 10 times. When a stretching magnification is less than 1.1 times, the stretching magnification may not lead to an improvement of toughness accompanied by the stretching, and when the stretching magnification exceeds 25 times, effects as high as the increased stretching magnification may not be obtained.

The stretching speed is preferably 10 to 20,000%/min, and more preferably 100 to 10,000%/min in a direction. When the stretching speed is less than 10%/min, manufacturing costs are increased because it takes a relatively long time to obtain a sufficient stretching magnification, and when the stretching speed exceeds 20,000%/min, fractures may occur in a stretched film.

In order to stabilize optical isotropy and mechanical properties of an acrylic film, the acrylic film may be subjected to a heat treatment (annealing) and the like after the stretching treatment.

According to an exemplary embodiment of the preset specification, at least one surface of the transparent film in which the coating layer is formed includes a surface coating layer.

In this case, in the forming of the coating layer, the composition is applied on a base film and dried by performing a method well-known in the art, for example, a bar coating method, a gravure coating method, a slot die coating method, and the like.

Although the drying process is performed through a convection oven and the like, the drying process is not limited thereto, and is performed preferably at a temperature of 90° C. to 150° C. for 10 seconds to 5 minutes. The drying temperature varies according to steps of coating the composition, and in case of a stretching-completed film, the drying process is performed in a range in which the drying temperature does not exceed a glass transition temperature (Tg) of the film, and in the case of including the stretching process, the drying process is performed at a stretching temperature at the same time as the stretching process, and the drying process is performed in a range in which the drying temperature does not exceed a decomposition temperature (Td) of the film.

For the acrylic film according to the present specification, at least one surface of the acrylic film may be subjected to a surface treatment before the coating layer is formed, in order to improve adhesive strength or adhesion strength with the coating layer, and in this case, examples of the surface treatment method may include one or more selected from the group consisting of an alkali treatment, a corona treatment, and a plasma treatment. In particular, when an optical film used in the present specification is an acrylic film that does not include a lactone ring, it is preferred that the surface treatment is performed.

Meanwhile, optionally, the optical film according to the present specification may further include a surface coating layer on at least one surface of the transparent film on which the coating layer is formed. The surface coating layer means a functional layer such as glare prevention, reflection prevention or hard coating.

In this case, the composition for surface coating to form the surface coating layer may be formed in various compositions according to functions to be imparted, and may include a binder resin, fine particles, and a solvent, and may further include an additive, if necessary.

For example, in the present specification, the binder resin of the composition for forming the surface coating layer may be an acrylic binder resin which is well-known in the art.

The type of acrylic binder resin is not particularly limited, and the acrylic binder resin is not particularly limited as long as the resin is known in the art. Examples of the acrylic binder resin include acrylate monomers, acrylate oligomers, or a mixture thereof, and the like. In this case, it is preferred that the acrylate monomers or the acrylate oligomers include at least one or more acrylate functional groups that are capable of participating in a curing reaction.

The types of acrylate monomers and the acrylate oligomers are not particularly limited, and the acrylate monomers and the acrylate oligomers usually used in technical fields to which the present specification belongs may be selected and used without limitations.

As the acrylate oligomers, it is possible to use urethane acrylate oligomers, epoxy acrylate oligomers, polyester acrylates, polyether acrylates, or a mixture thereof, and the like. Examples of the acrylate monomers include dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylolpropane ethoxy triacrylate, 1,6-hexanediol diacrylate, propoxylated glycerol triacrylate, tripropylene glycol diacrylate, ethylene glycol diacrylate, or a mixture thereof, but are not limited thereto.

Meanwhile, the content of the solvent is 50 parts by weight to 1,000 parts by weight based on 100 parts by weight of the binder resin, but is not limited thereto. When the content of the solvent satisfies the numerical range, the coating properties of the surface coating layer is excellent, the film strength of the coating film is excellent, and a thick film is easily prepared.

The type of the solvent which may be used in the present specification is not particularly limited, and an organic solvent may be usually used. For examples, it is possible to use one or more selected from the group consisting of C1 to C6 lower alcohols, acetates, ketones, cellosolves, dimethylformamide, tetrahydrofuran, propylene glycol monomethyl ether, toluene, and xylene. Examples of the lower alcohols include methanol, ethanol, isopropyl alcohol, butyl alcohol, isobutyl alcohol, and diacetone alcohol, examples of the acetates include methyl acetate, ethyl acetate, isopropyl acetate, butyl acetate, and cellosolve acetate, and examples of the ketones include methyl ethyl ketone, methyl isobutyl ketone, acetyl acetone, and acetone, but the examples thereof are not limited thereto.

Meanwhile, the composition for forming a surface coating layer according to the present specification may further include a UV curing initiator added for the purpose of curing through UV irradiation, if necessary. Examples of the UV curing initiator include one or two or more selected from the group consisting of 1-hydroxy cyclohexylphenyl ketone, benzyl dimethyl ketal, hydroxyl dimethyl acetophenone, benzoin, benzoin methyl ether, benzoin ethyl ether, benzoin isopropyl ether, and benzoin butyl ether, but are not limited thereto.

It is preferred that the UV curing initiator is added in an amount of 0.1 part by weight to 10 parts by weight based on 100 parts by weight of the binder resin. When the content of the UV curing initiator satisfies the numerical range, sufficient curing may occur, and the film strength of a film may be improved.

The composition for forming a surface coating layer according to the present specification may further include one or more additives selected from a leveling agent, a wetting agent, and a defoaming agent. The content of the additives is 0.01 parts by weight to 10 parts by weight based on 100 parts by weight of the binder resin.

In the present specification, thickness of the surface coating layer may be about 1 μm to about 30 μm and preferably about 1 μm to about 20 μm, but is not limited thereto. When the thickness of the surface coating layer satisfies the numerical range, defects such as cracks may be prevented from being generated while implementing sufficient functionality.

Meanwhile, the surface coating layer may be formed by a method of applying a composition for forming a surface coating layer on an optical film according to the present specification on which the coating layer is formed, and then drying and/or curing the composition, and in this case, the application may be carried out by application methods well-known in the art, for example, a wet coating such as a roll coating method, a bar coating method, a spray coating method, a dip coating method, and a spin coating method. However, the application method is not limited thereto, but it is natural that various application methods used in the art may be used.

The drying and/or curing are/is performed by a method of irradiating heat and/or light onto the composition for forming the surface coating layer, which is applied on the coating layer, and the drying step and the curing step are carried out sequentially or simultaneously. However, it is more preferred that the curing step is performed through a method of irradiating lights such as UV light in consideration of the processing convenience, and the like.

The curing conditions may be appropriately controlled according to a mixing ratio or components of the composition for forming the surface coating layer, and in the case of an electron beam or UV curing, the irradiation amount is preferably 0.01 J/cm$^2$ to 2 J/cm$^2$ for 1 second to 10 minutes. In the electron beam or UV curing, mechanical properties such as abrasion resistance are excellent, and the durability of the acrylic film may be improved because the binder resin may be sufficiently cured when the curing time satisfies the numerical range.

Meanwhile, the optical film of the present specification may further include a separate layer for the other purpose in addition to the surface coating layer. For example, the optical film of the present specification may further include a contamination preventing layer for preventing contamination of a display surface.

The optical film of the present specification as described above may be usefully used as a protective film for a polarizing plate. More specifically, the polarizing plate of the present specification may include a polarizer and the optical film according to the present specification, which is disposed on at least one surface of the polarizer.

In this case, the polarizer is not particularly limited, and a polarizer well-known in the art, for example, a film composed of polyvinyl alcohol (PVA) including iodine or a dichroic dye is used. In the present specification, the polarizer means a state in which a protective film (transparent film) is not included, and the polarizing plate means a state in which a protective film (transparent film) is included.

Meanwhile, the polarizing plate according to the present specification may further include an adhesive layer on one surface or both surfaces of the polarizer for attaching the optical film to the polarizer, and for example, in the polarizing plate of the present specification, the structure of one surface may be composed of [a transparent film/a coating layer/an adhesive layer/a polarizer] based on the polarizer, but is not limited thereto. In this case, as the adhesive which may be used when the adhesive layer is formed, a water-based or non-water based adhesive generally used in the art is preferred.

Examples of the water-based adhesive include a polyvinyl alcohol-based adhesive, an acrylic adhesive, an epoxy-based adhesive, a urethane-based adhesive, and the like. In consideration of adhesive strength with the polarizer, and the like, the polyvinyl alcohol-based adhesives among them are preferred, and modified polyvinyl alcohol-based adhesives including an acetoacetyl group and the like among them are particularly preferred. As specific examples of the polyvinyl alcohol-based adhesives, it is possible to use Gohsefiner Z-100, Z-200, Z-200H, Z-210, Z-220, Z-320, and the like manufactured by Nippon Synthetic Chemical Industry Co., Ltd., but the polyvinyl alcohol-based adhesives are not limited thereto.

Here, adhesion of the polarizer with the optical film using a water-based adhesive may be performed by a lamination method of first coating the adhesive on the surface of the PVA film, which is an optical film or a polarizer, by using a roll coater, a gravure coater, a bar coater, a knife coater, or a capillary coater, and the like, and heat-compressing or room temperature-compressing the protective film and the polarizing film using a laminating roll before the adhesive is completely dried. When a hot melt-type adhesive is used, a heat-compression roll needs to be used.

Meanwhile, the non-water based adhesives are preferably UV-curable adhesives and are not particularly limited, but examples of the non-water based adhesives include: adhesives using a light radical polymerization reaction such as (meth)acrylate-based adhesives, en/thiol-based adhesives, and unsaturated polyester-based adhesives; or adhesives using a light cationic polymerization reaction such as epoxy-based adhesives, oxetane-based adhesives, epoxy/oxetane-based adhesives, and vinyl ether-based adhesives, and the like. Adhesion of the polarizer and the optical film using the non-water based adhesives is performed by a method of applying an adhesive composition to form an adhesive layer, laminating the polarizer with the optical film, and then curing the adhesive composition through light irradiation.

The above-described polarizing plate according to the present specification has excellent adhesive strength with the adhesive layer and the surface coating layer, excellent slip properties and anti-blocking properties, and excellent water resistance.

The polarizing plate according to the present specification, which is manufactured as described above, may be used for various uses. Specifically, the polarizing plate according to the present specification may be preferably used in image display devices including a polarizing plate for a liquid crystal display (LCD), a polarizing plate of an organic electroluminescence display device for preventing reflection, and the like. Further, the polarizing plate according to the present specification may be applied to a composite polarizing plate in which various functional films, for example, various optical layers such as phase difference plates such as a $\lambda/4$ plate and a $\lambda/2$ plate, light diffusion plates, viewing angle-expanding plates, luminance improving plates, reflection plates and the like are combined.

Hereinafter, the present specification will be described in detail with reference to the Examples for specifically describing the present specification. However, the Examples according to the present specification may be modified in various forms, and it is not interpreted that the scope of the present specification is limited to the Examples to be described below. The Examples of the present specification are provided for more completely explaining the present specification to the person with ordinary skill in the art.

EXAMPLES

Preparation Examples 1 to 6

The compositions in Preparation Examples 1 to 6 were prepared by mixing a polymer resin, a crosslinking agent, fine particles, and water in the configuration and content described in the following [Table 1].

TABLE 1

| Classification | | Polymer resin Type | Polymer resin Content (g) | Crosslinking agent Type | Crosslinking agent Content (g) | Fine particles Type | Fine particles Content (g) | Water (g) |
|---|---|---|---|---|---|---|---|---|
| Preparation Example 1 | A | A-645GH | 30 30 wt % of solid content) | ADH | 0.5 | Silica 100 nm (20 wt % of solid content | 5 | 64.5 |
| Preparation Example 2 | B | CK-PUD-1004A | 30 (30 wt % of solid content) | ADH | 0.5 | Silica 100 nm (20 wt % of solid content | 5 | 64.5 |
| Preparation Example 3 | C | A-645GH | 30 (30 wt % of solid content) | IDH | 0.5 | Silica 100 nm (20 wt % of solid content | 5 | 64.5 |
| Preparation Example 4 | D | A-645GH | 30 (30 wt % of solid content) | — | — | Silica 100 nm (20 wt % of solid content | 5 | 65 |
| Preparation Example 5 | E | CK-PUD-1004A | 30 (30 wt % of solid content) | — | — | Silica 100 nm (20 wt % of solid content | 5 | 65 |
| Preparation Example 6 | F | A-645GH | 30 (30 wt % of solid content) | ADH | 3 | Silica 100 nm (20 wt % of solid content | 5 | 64.5 |

Meanwhile, in [Table 1], A-645GH is a trade name of a polyester acrylic resin sold by Takamatsu Oil & Fat, CK-PUD-1004A is a trade name of a polyurethane-based resin sold by ChoKwang Paint Industries Co., Ltd., ADH is an adipic dihydrazide crosslinking agent, and IDH is an isophthalic dihydrazide crosslinking agent.

Example 1

A non-stretched film was prepared by using a T-die film-making machine with a resin of poly(cyclohexylmaleimide-co-methylmethacrylate) (PMMA830HR manufactured by LG MMA) under conditions of 250° C. and 250 rpm, and then a film stretched at 135° C. in the MD direction by 1.8 times was prepared, and both surfaces of the film before being coated were subjected to corona treatment under conditions 50 W/m$^2$/min.

Next, the one surface of the acrylic film subjected to corona treatment was coated with composition (A) using a Mayer bar And then, an acrylic film in which a coating layer was formed on one surface thereof was prepared by being stretched in the TD direction at 135° C. by 2.0 times. In this case, the thickness of the coating layer was 600 nm.

Example 2

An acrylic film was prepared in the same manner as in Example 1, except that (B) was used as the composition.

Example 3

An acrylic film was prepared in the same manner as in Example 1, except that (C) was used as the composition.

Comparative Example 1

An acrylic film was prepared in the same manner as in Example 1, except that (D) was used as the composition.

Comparative Example 2

An acrylic film was prepared in the same manner as in Example 1, except that (E) was used as the composition.

Comparative Example 3

An acrylic film was prepared in the same manner as in Example 1, except that (F) was used as the composition.

Experimental Example 1. Evaluation of Coating Properties

The Coating properties was evaluated by shining a flashlight on the acrylic films prepared according to Examples 1 to 3 and Comparative Examples 1 to 3. The results in the following [Table 2] were obtained by marking the case where the film was transparent without any spot or pattern as OK and the case where the film had a pattern such as a spot or a dot as NG.

Experimental Example 2. Evaluation of Solvent Resistance

The solvent resistance was evaluated by rubbing the coating surfaces of the acrylic films, which are prepared according to Examples 1 to 3 and Comparative Examples 1 to 3, with cotton soaked with ethanol 10 times. The results in the following [Table 2] were obtained by marking the case where there was no change in coating appearance as ○, the case where there was a weak whitening phenomenon as Δ, and the case where the acrylic film was completely dissolved, rubbed out and exposed as X.

Experimental Example 3. Evaluation of Adhesion Strength of Hard Coating Layer

An acrylic film on which a UV curable hard coating layer had been formed was prepared by applying an acrylic UV curable hard coating solution on a coating layer formed on one surface of each of the acrylic films prepared according to Examples 1 to 3 and Comparative Examples 1 to 3, blow-drying the film at a temperature of 60° C. for 2 minutes, and then performing a UV curing treatment.

Next, adhesion strength was evaluated as the degree to which the coating layer fell off by making a cut in_ the UV curable hard coating layer into a size of 10×10 and a width of 1 mm, attaching a tape on the surface, and then taking off the tape. The results in the following [Table 2] were obtained by marking the case where the number of grids fell off was 0 to 10 as ◎, the case where the number thereof was 11 to 20 as ○, the case where the number thereof was 21 to 50 as Δ, and the case where the number thereof was 51 or more as X.

Experimental Example 4. Evaluation of Water Resistance of Polarizing Plate

An acrylic film/a PVA device/an acrylic film were laminated in this order by disposing the coating layer of each of the acrylic films, which were prepared according to Examples 1 to 3 and Comparative Examples 1 to 3, toward the PVA device, a UV curable adhesive was applied between the films, and then the conditions were set such that the thickness of the final adhesive layer was 1 to 2 μm, and the laminate was allowed to pass through a laminator. And then, a polarizing plate was manufactured by using a UV illumination apparatus to irradiate UV light.

Glass was laminated on the polarizing plate by using a tackifier (pressure sensitive adhesive, PSA), and then the laminate was immersed in a thermostat at 60° C. After 8 hours elapsed, water resistance was measured by a method of confirming whether the end portion of the polarizing plate was discolored, and the results in the following [Table 2] were obtained by marking the case where there was no deformation as OK and the case where the end portion was discolored as NG.

TABLE 2

| Classification | Evaluation of Coating properties | Evaluation of Solvent Resistance | Evaluation of Adhesion Strength of Hard Coating Layer | Evaluation of Water Resistance |
|---|---|---|---|---|
| Example 1 | OK | ○ | ◎ | OK |
| Example 2 | OK | Δ | ○ | OK |
| Example 3 | OK | ○ | ◎ | OK |
| Comparative Example 1 | OK | ○ | ◎ | NG |
| Comparative Example 2 | OK | X | X | OK |
| Comparative Example 3 | NG | ○ | ○ | OK |

As shown in [Table 2], it can be seen that in the case of Examples 1 to 3 which are acrylic films including a coating layer formed using the coating composition of the present specification, coating properties and solvent resistance were good and adhesion strength and water resistance of the hard coating layer were excellent, but that in the case of Comparative Examples 1 and 2 in which a coating layer was formed using a coating composition which does not include a crosslinking agent, solvent resistance and adhesion strength or water resistance of the hard coating layer significantly deteriorated, and that in the case of Comparative Example 3 in which the content of the crosslinking agent exceeded the range of the present specification, water resistance was good, but coating properties was not good and adhesive strength of the hard coating layer weakly deteriorated.

As shown in [Table 2], it can be seen that in the case of Example 1, in which the polyester acrylic resin was used, and Example 2, in which the polyurethane-based resin was used, Example 1 was better than Example 2 in terms of solvent resistance and adhesion strength of the hard coating layer.

Even though exemplary embodiments of the present specification have been described in detail, it will be obvious to a person with ordinary skill in the art that the right scope of the present specification is not limited thereto, and various modifications and alterations are possible without departing from the technical spirit of the present specification described in the claims.

What is claimed is:

1. An optical film comprising:

a transparent film; and a coating layer on at least one surface of the transparent film, wherein the coating layer is formed using a composition comprising a polymer resin, a dihydrazide-based crosslinking agent, and water-dispersible fine particles, wherein the composition comprises:

100 parts by weight of the polymer resin, wherein the polymer resin is a polyester acrylic resin including an ester-based repeating unit and an acrylic repeating unit, and the acrylic repeating unit includes an epoxy group;

0.01 parts by weight to 10 parts by weight of the dihydrazide-based crosslinking agent based on 100 parts by weight of the polymer resin, wherein the dihydrazide-based crosslinking agent comprises one or more selected from the group consisting of adipic dihydrazide and isophthalic dihydrazide; and 0.01 parts by weight to 30 parts by weight of the water-dispersible fine particles based on 100 parts by weight of the polymer resin.

2. The optical film of claim 1, wherein the polyester acrylic resin comprises a repeating unit of the following Formula 2 and a repeating unit of the following Formula 4:

Formula 2

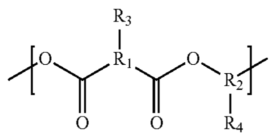

wherein in Formula 2:

$R_1$ and $R_2$ are the same as or different from each other and are each independently a substituted or unsubstituted $C_1$ to $C_{20}$ alkylene group, a substituted or unsubstituted $C_6$ to $C_{20}$ arylene group, or a substituted or unsubstituted $C_5$ to $C_{20}$ cycloalkylene group; and $R_3$ and $R_4$ are the same as or different from each other, at least one thereof is a carboxyl group, a hydroxyl group, or a sulfonate group, and $R_3$ and $R_4$ are each independently hydrogen, a carboxyl group, a hydroxyl group, a sulfonate group, a substituted or unsubstituted $C_1$ to $C_{20}$ alkyl group, a substituted or unsubstituted $C_6$ to $C_{20}$ aryl group, or a substituted or unsubstituted $C_5$ to $C_{20}$ cycloalkyl group;

Formula 4

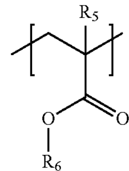

wherein in Formula 4, $R_5$ is hydrogen or a substituted or unsubstituted $C_1$ to $C_{20}$ alkyl group, and $R_6$ is an epoxy group.

3. The optical film of claim 1, wherein the water-dispersible fine particles comprise one or more selected from the group consisting of silica, titania, alumina, zirconia, and antimony-based fine particles.

4. The optical film of claim 1, wherein the coating layer has a thickness of 50 nm to 2,000 nm.

5. The optical film of claim 1, wherein the transparent film is an acrylic film.

6. The optical film of claim 1, comprising a surface coating layer on at least one surface of the transparent film on which the coating layer is formed.

7. A polarizing plate comprising:

a polarizer; and the optical film of claim 1 on at least one surface of the polarizer.

* * * * *